Figure 1:
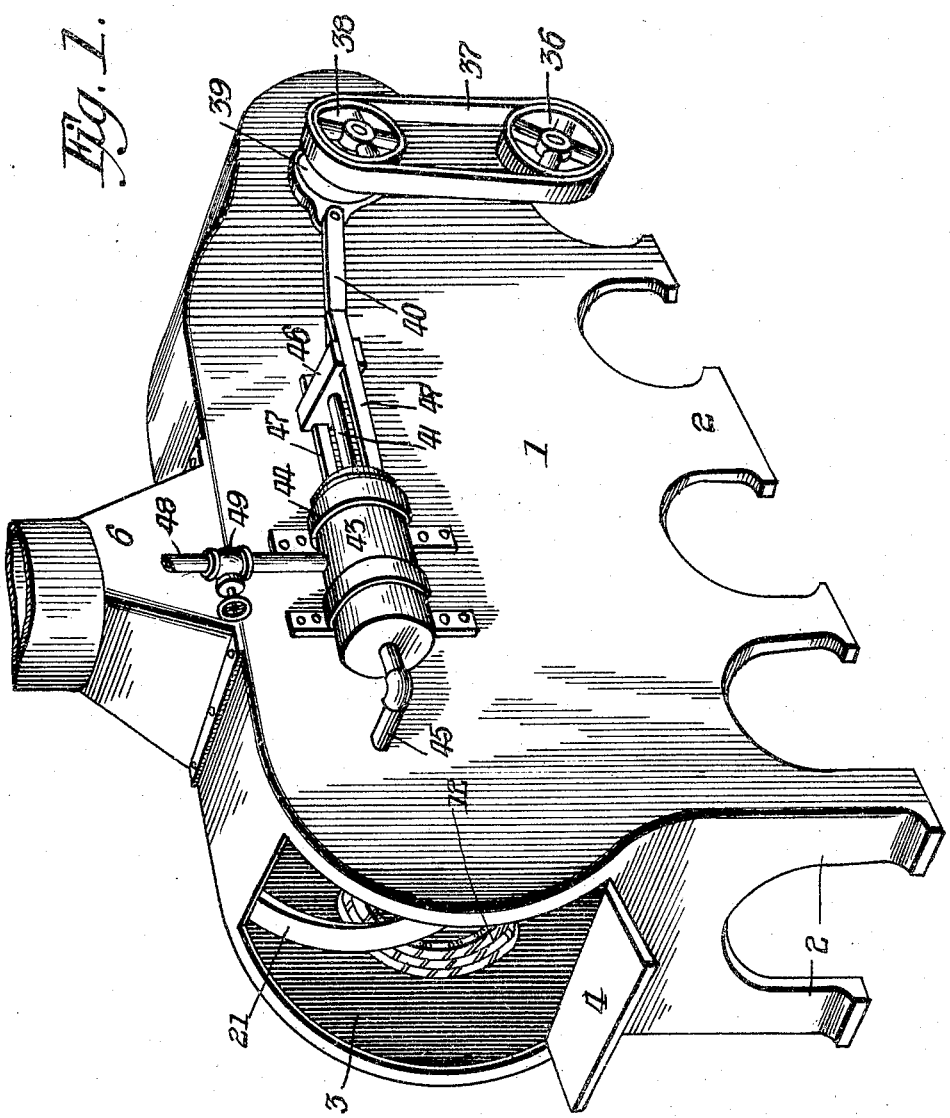

No. 794,131. PATENTED JULY 4, 1905.
E. L. SONS.
PIE BAKING MACHINE.
APPLICATION FILED NOV. 19, 1904.

5 SHEETS—SHEET 1.

Witnesses:

Inventor
E. L. Sons,
By
Attorneys.

No. 794,131. PATENTED JULY 4, 1905.
E. L. SONS.
PIE BAKING MACHINE.
APPLICATION FILED NOV. 19, 1904.

5 SHEETS—SHEET 3.

Fig. 3.

Witnesses:
K. H. Butler
C. Klostermann

Inventor
E. L. Sons,
By N. C. Evert & Co.
Attorneys.

No. 794,131. PATENTED JULY 4, 1905.
E. L. SONS.
PIE BAKING MACHINE.
APPLICATION FILED NOV. 19, 1904.

5 SHEETS—SHEET 4.

Witnesses:
Inventor,
E. L. Sons,
By H. C. Everett
Attorneys

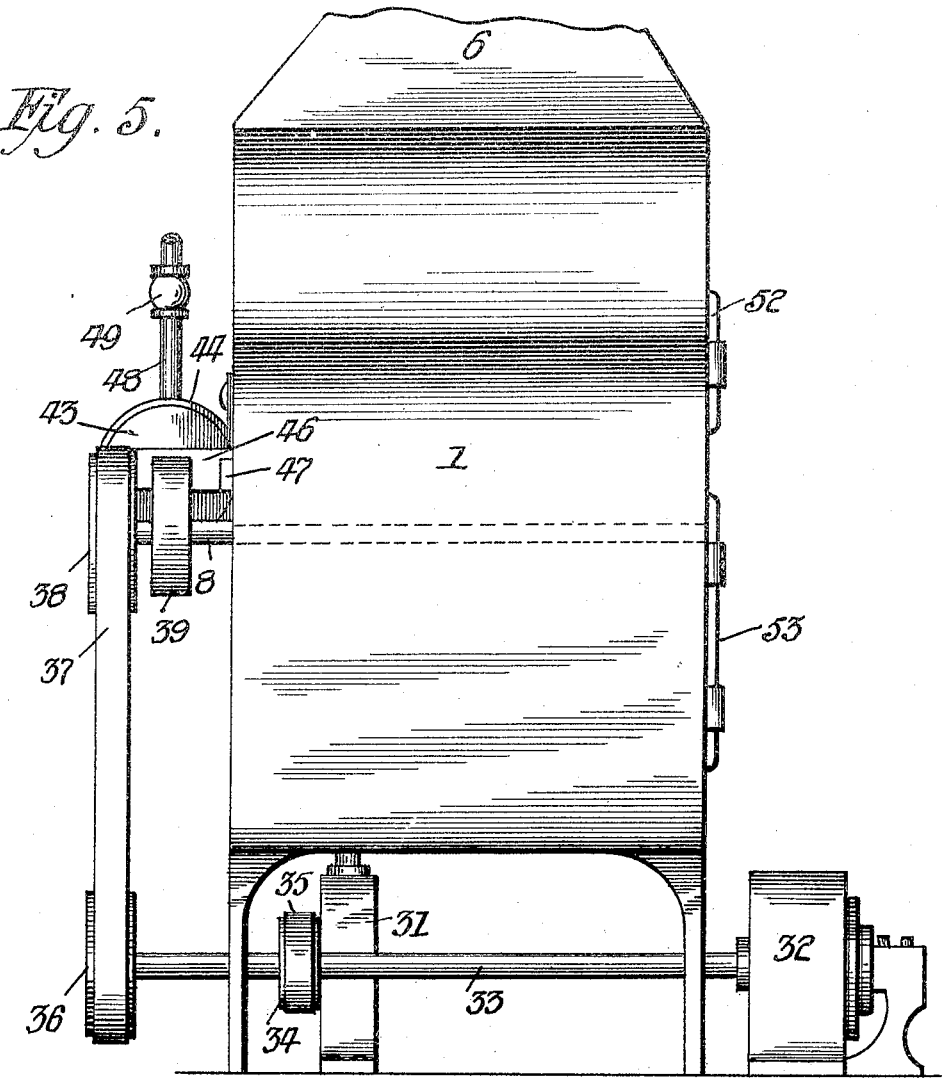

No. 794,131.      Patented July 4, 1905.

UNITED STATES PATENT OFFICE.

ERNEST L. SONS, OF PITTSBURG, PENNSYLVANIA, ASSIGNOR OF ONE-HALF TO WILLIAM SANGL, OF PITTSBURG, PENNSYLVANIA.

PIE-BAKING MACHINE.

SPECIFICATION forming part of Letters Patent No. 794,131, dated July 4, 1905.

Application filed November 19, 1904. Serial No. 233,480.

*To all whom it may concern:*

Be it known that I, ERNEST L. SONS, a citizen of the United States of America, residing at Pittsburg, in the county of Allegheny and State of Pennsylvania, have invented certain new and useful Improvements in Pie-Baking Machines, of which the following is a specification, reference being had therein to the accompanying drawings.

This invention relates to certain new and useful improvements in baking-machines, and relates more particularly to a machine designed for the baking of pie-crusts, principally the bottoms, but may also be employed for the baking of tops as well.

The object of the present invention, broadly speaking, is to provide a machine in which the dough of which the crusts are formed is automatically fed to a plurality of molds arranged to travel in an endless course and which during their travel are subjected to the action of heat derived from burners suitably disposed within the machine. The molds are so constructed and means is provided for supporting the same in such a manner as to present the molds in an open position when they arrive where the dough is delivered, and as they continue in their travel they are automatically closed before being carried to the position where they are subjected to the action of heat to effect the baking of the dough. After the molds have been carried away from the zone of the heat derived from the burners they are again automatically opened, whereby to permit an attendant standing at one end of the machine to remove the baked crusts from the mold before the latter is again carried around into position to receive another deposit of dough. Motion may be imparted to the endless belt and to the dough-feeding mechanism by any desired means, though it is preferable to employ a motor for this purpose, as this driving means will permit of ready adjustment, so as to drive the molds around their path of travel at any desired rate of speed.

As it is necessary in a machine of this character to employ a fuel that will enable the flame to be projected into close proximity to the molds, gas is generally employed as the fuel, and it is necessary when employing this fuel to provide means for supplying the same with a sufficient amount of oxygen to effect combustion. It is desirable for this reason to employ a pump or fan connected to the fuel-supply and which may be operated from the same source of power as is employed for driving the endless belt carrying the molds and for actuating the dough mechanism.

In describing the invention in detail reference will be had to the drawings accompanying this application, wherein like numerals of reference designate corresponding parts throughout the several views, in which—

Figure 2:
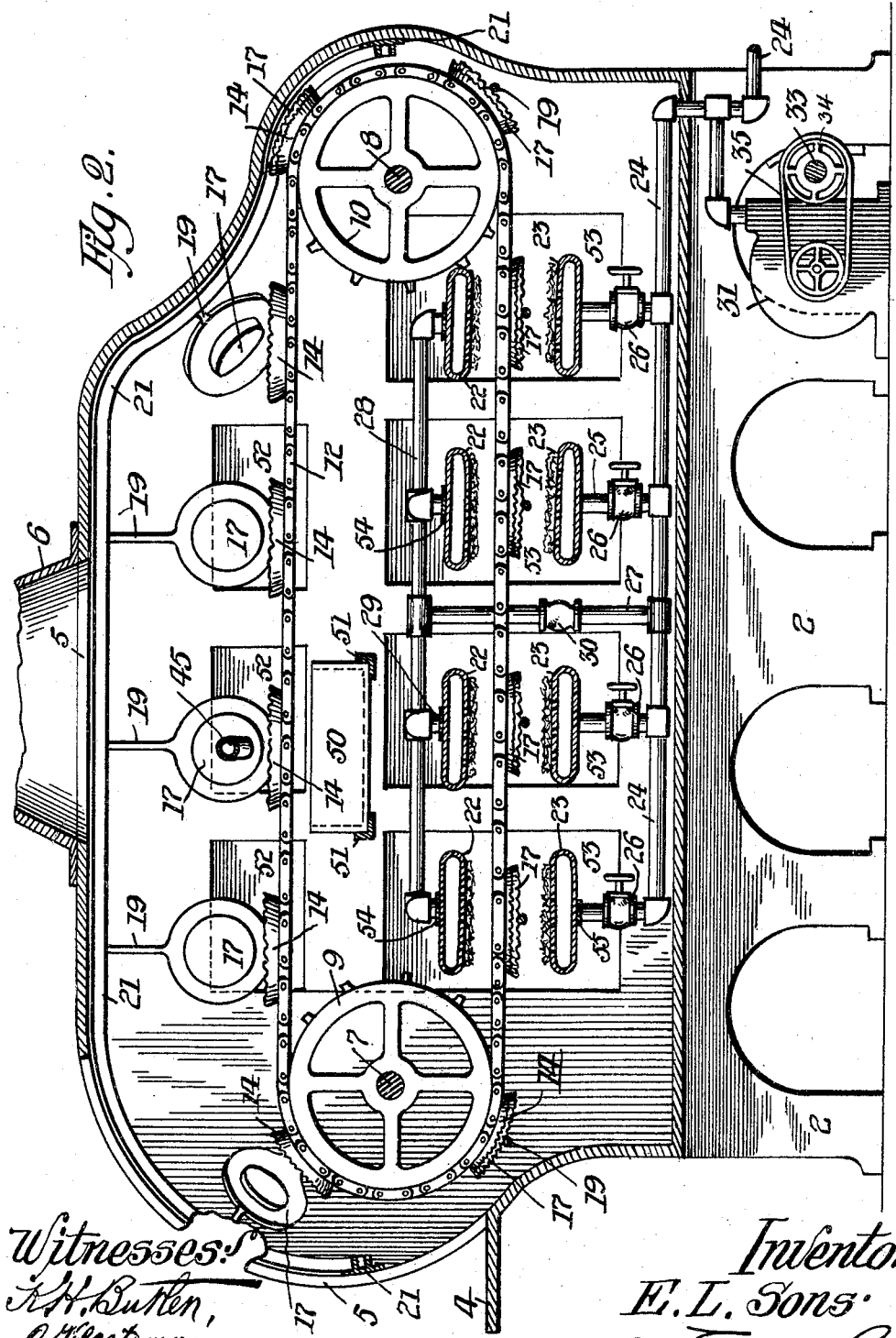
Figure 4:
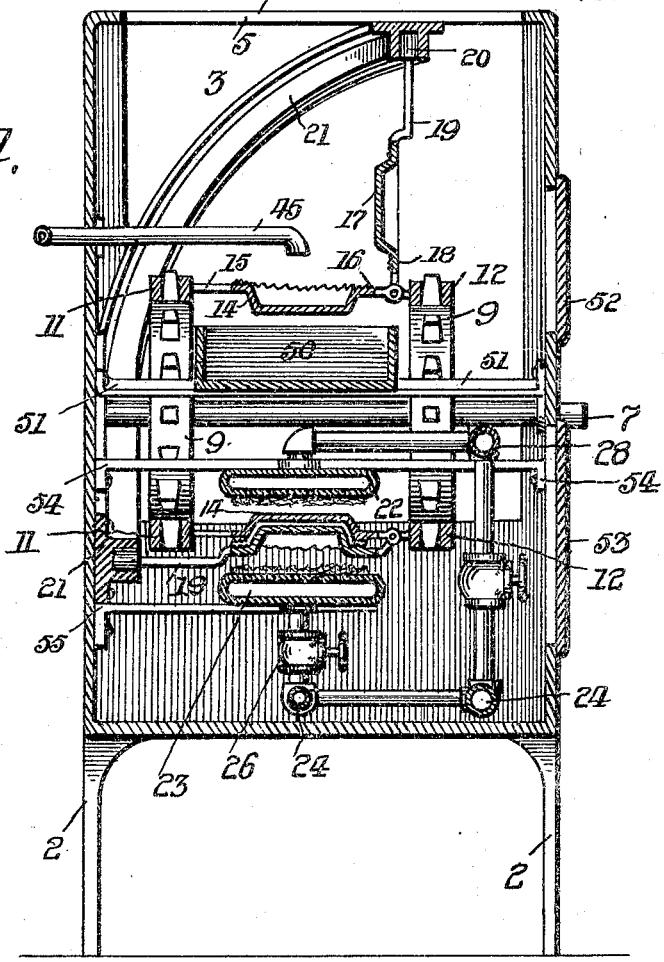
Figure 6:
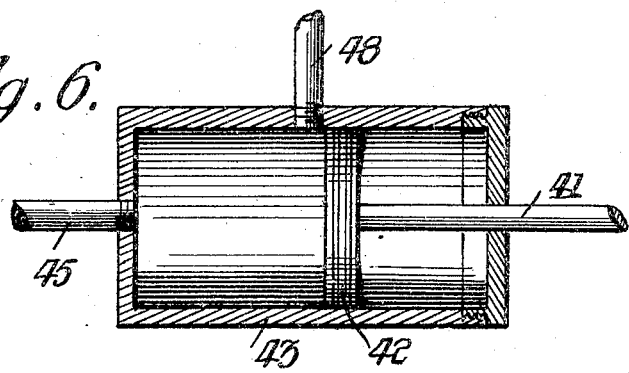

Figure 1 is a perspective view of the machine constructed in accordance with my invention, showing the hood on top of the machine partly broken away. Fig. 2 is a central longitudinal sectional view. Fig. 3 is a horizontal sectional view. Fig. 4 is a transverse vertical sectional view. Fig. 5 is a rear elevation showing the hood on top of the casing partly broken away. Fig. 6 is a sectional view of the dough-feeding mechanism.

In practicing my invention I employ a plurality of molds, which, besides acting as the mold for shaping the dough into crust shape, serve as the holding means or bake-pans for the dough while it is being baked. These molds are arranged to travel in an endless course within a suitable casing and during their travel pass between two rows of burners, whereby they are subjected to the action of the heat thereof.

The mechanism above stated is inclosed within a suitable housing or casing 1. It is preferable, whether the casing be made in one piece or of separate pieces connected together, to cut away the lower edge of the sides and ends, as shown in the present illustration, in order to form supporting-feet 2. For the reason that I desire to cast this housing or casing in one piece I have so shown the same and will so describe it without limiting myself to such construction. The forward end of the housing or casing is cut away to provide an opening 3, a portion of the end being turned down at right angles to form a shelf 4, the purpose of which will more presently appear. An opening 5 is provided in the top of the casing or housing, and to the top around this opening is secured a hood 6, which may be connected to a stack (not shown) or may be, if desired, led to a point outside of the building in which the apparatus is located in order to conduct away the fumes arising from the burners. The particular shape of the casing or housing is immaterial except in the following respect: The ends thereof are preferably so shaped that the track, which forms one of the elements or instrumentalities for the opening and closing of one of the sections of the mold, may be secured directly to the inner walls of the housing or casing without necessitating the employment of hangers or brackets, as would be required in case the track were mounted a distance away from the inner walls of said casing or housing.

Journaled in the side walls of the casing or housing in horizontal alinement are shafts 7 8, on which are mounted sprocket-wheels 9 9 and 10 10, respectively. Chains 11 12 travel over these wheels, and these chains are connected together by the members which carry the molds, which molds will now be described.

Each mold comprises two sections or members, one of which sections or members remains fixed with respect to the chains, while the other of said sections or members is hinged, so as to be opened and closed to permit the depositing of the dough therein and of the removal of the baked crusts. In the present illustration of my invention I have shown the molds of a form adapted for the baking of bottoms; but it will readily be apparent that the device is equally applicable to the baking of tops, merely necessitating a change in the form of the mold. The member or section 14 of the mold I will herein term as the "lower" member, as it is in this member that the dough is received. In the present illustration this section or member is substantially pan shape and provided with a crimped or corrugated edge. It is provided at opposite sides with arms 15 16, respectively, which connect with the chains 11 and 12. Hinged to the arm 16 is the other section or member of the mold, which is herein termed the "upper" or "top" section 17. This section or member 17, at the side opposite to the arm 18 thereof, that is hinged to the arm 16, is provided with an arm 19, which carries a head or roller 20 to engage in the way formed therefor in a track 21. The track 21, it will be observed by reference to the different views of the drawings, is irregular in its endless course, in order to effect the opening of the molds at the desired time, the closing of said molds prior to their being carried into the zone of heat derived from the burners, and the reopening of the molds to such an extent as to permit the removal therefrom of the baked crusts when the molds open at the front end of the casing, and the complete opening of the molds prior to their being brought into position to receive another deposit of dough. To this end the track 21 extends horizontally along one side wall of the casing or housing and at the front end of the machine extends upwardly and across the opening 3 at an angle, being carried upwardly to the top of the casing or housing to a point adjacent the opposite side wall of the casing or housing, and then extends in a horizontal line along underneath of the top of the casing or housing until it approaches the opposite end, where it extends down across the space between the two side walls until it joins with the horizontal portion along the one side wall first described. By this construction it will be observed that as the molds are carried along between the upper row of burners 22 and the lower row of burners 23 they will be held closed due to the ends of the arms 19 traveling in the horizontal portion of the track, as seen in Fig. 4 of the drawings. As the molds approach the forward end of the machine the arms 19 enter the inclined upwardly-extending portion of the track, and as the molds are brought in front of the opening 3, as shown for one of the molds in Fig. 2 of the drawings, the upper section 17 of each mold will be sufficiently opened to permit an attendant standing at the front of the machine to remove the baked crusts therefrom. As the molds continue their travel until they are again brought up on the horizontal portion of the endless chains, the upper section of the molds have been completely opened and stand in the position as shown in Figs. 2 and 4 of the drawings. As they are carried rearwardly the arms 19 ride in the descending track at the rear of the machine, again closing the molds, as is clearly seen in Fig. 2 of the drawings.

The construction illustrated is that adapted to employ gas as fuel, the upper and lower set of burners being fed through a common supply-pipe 24, which feeds the burners 23 through branches 25, each branch being preferably provided with a cut-off valve 26, whereby one or more of the burners may be cut off from the supply, if desired. A branch pipe 27 connects with the supply 24 to feed a pipe 28, to which the branches 29, that feed the burners 22, are connected. Cut-off valves may, if desired, be employed for each one of the burners 22, though generally I only employ a cut-off or controlling valve 30 in the pipe 27. In order to supply a sufficient amount of air to the gas to effect combustion, I preferably connect to the supply-line 24 either a blower or fan 31 (conventionally shown in Fig. 2 of the drawings) and which may be operated from the same source of energy as supplies motive power for the endless chain carrying the molds.

I have shown conventionally a motor 32 for driving the molds and the dough-feeding mechanism, which motor imparts motion to the drive-shaft 33. On this drive-shaft is a pulley 34, which receives the belt 35 to drive the fan or blower 31. On the outer end of the drive-shaft is a pulley 36, which receives drive-belt 37, that also passes over a pulley 38 on the extended end of the shaft 8. On this shaft 8 is an eccentric 39, the rod 40 of which is pivotally connected to the outer end of the piston-rod 41. The piston 42 of this rod operates in a cylinder 43, which is strapped by straps 44, as shown, or secured in any other desired manner to the side of the casing or housing. Communicating with the opposite end of the cylinder 43 is a discharge or feed pipe 45, which leads inwardly through the side wall of the casing or housing to a point directly over the molds. The piston-rod 41 is secured in a cross-head 46, that operates on guides 47, carried by the cylinder 43. A feed or supply pipe 48 communicates with the cylinder 43, through the top thereof, and leads to a suitable hopper or other container (not shown) and is preferably provided with a controlling valve or cock 49.

In order to catch any waste or discharge which may come from pipe 45 at a time when no mold happens to be beneath the discharge end of this pipe, I provide a suitable removable box 50 at a point directly beneath the discharge end of pipe 45, supporting this box on shelves 51 or any other desired manner.

In operation when the controlling valve or cock 49 is opened, allowing the batter or dough to flow into cylinder 43 and motion being imparted to the drive-shaft, the piston 42 will compress the dough or batter and force the same through the discharge-pipe 45 into one of the molds which is located beneath said discharge-pipe 45. In Fig. 6 the piston 42 is shown at the limit of its outstroke, and it is to be observed that the piston does not pass the discharge end of pipe 48. It will also be observed by reference to this figure and also to Fig. 1 of the drawings that the feed-pipe 45 communicates centrally of the end of cylinder 43. The batter fed through pipe 48 into the cylinder 43 is regulated in flow by means of the valve 49, and this flow is so regulated that it requires the outstroke or compressing stroke of the piston 42 to force the bottom out through feed-pipe 45. On the return or in stroke of piston sufficient suction is created to check the flow of the batter until the piston again begins its outstroke, and by that time another mold has been brought into position to receive the charge. It is to be understood that in this operation, the driving means is so arranged that one of the molds is brought in position underneath the discharge end of pipe 45 upon each compressing stroke of the piston 42, or the driving mechanism may be so arranged as to require two or more compressing strokes of the piston 42 to effect a discharge of the batter or dough through pipe 45, a mold being brought into open position underneath the pipe just prior to each discharge therefrom. In other words, the molds are to be so spaced on the chains and the chains are to be driven at such rate of speed that a mold is brought into position underneath the discharge end of pipe 45 at the completion of each stroke of the piston 42, or the molds are so spaced on the chain and driven at such a rate of speed as to bring a mold into receiving position each time the piston has made two compressions. It will be observed that as a deposit of batter or dough is made into the mold the same is immediately carried rearwardly and another mold approaches the discharge end of pipe 45, and as the molds approach the rear end of the machine the arms 19 thereof, traveling in the descending portion of the track, closes these molds prior to their being carried around sprocket-wheel 10 and holds the same closed during their passage between the two rows of burners. The opening movement of the molds is begun at the time they begin to ascend the inclined track at the forward end of the machine, and by the time they have approached the opening 3 in said forward end they are sufficiently opened to permit the removal of the baked crusts therefrom, being entirely opened again when they reach the upper horizontal portion of their endless course.

In order to permit of access being had to the machine, doors 52 53 are provided in one of the side walls, whereby the receptacle 50 may be removed at any desired time and also permitting access to the different parts of the interior mechanism.

To relieve the weight of the burners off the supply-pipes, I preferably employ supporting-brackets 54 55, as clearly seen in Fig. 4 of the drawings, which may be attached to both side walls or only one side wall, as may be desired.

When the controlling-valve 49 has been regulated so as to feed any predetermined quantity, it will be observed that all that is necessary is the one attendant at the front of the machine to remove the baked crusts from the mold as they are carried upwardly in front of the opening, the shelf 4 at the front of the machine being provided for the sake of convenience in having a support for the crusts after removal from the molds.

The burners as shown in the drawings are arranged and adapted for the use of gas as a fuel, and the molds are carried through the heat zone of the furnace or oven thus produced to effect the baking of the substance carried in the molds, though it will be evident that other arrangement than that shown could be provided for producing a furnace or oven through which the molds are carried during their travel.

In the practice of the invention it will be observed that various changes may be made in the details of construction without departing from the general spirit and scope of the invention.

Having fully described my invention, what I claim as new, and desire to secure by Letters Patent, is—

1. The combination with a casing or housing having an opening in the forward end thereof, and an endless track extending horizontally along one side wall of the casing or housing, upwardly at an angle across the opening in the forward end of the casing or housing, horizontally along the top, and downwardly at an angle across the rear end of the housing or casing, of shafts journaled in the housing, one of which is a drive-shaft, sprockets mounted on said shafts, chains passing over said sprockets, a plurality of molds each embodying two members hinged together and one of which members has arms projecting on opposite sides thereof and connected to the chains, and the other of which members has an arm engaging the track, an oven through which the molds are carried by the chains, a charging-cylinder supported outside the casing and having a discharge-pipe leading from one end thereof through the casing-wall and terminating at a point directly over the path of travel of the molds, means for regulating the feed of substance to said cylinder, and a piston working in the cylinder to discharge the substance, with its rod connected to the drive-shaft, substantially as described.

2. The combination with the casing or housing, and two rows of heating-burners therein, disposed one row above the other, of an endless carrier arranged in the casing or housing, a drive-shaft therefor, a plurality of molds each embodying two members hinged together and one of which is connected at its opposite sides to the carrier, and the other of which has an outwardly-projecting arm, an irregular endless track into which said arm extends, and which track is arranged to hold the molds closed during the time they are traveling between the two rows of burners, and in the open position while traveling from the front to the rear of the casing or housing, a charging-cylinder secured to the side of the housing or casing a discharge-pipe communicating centrally with the discharge end of said cylinder and extending through the wall of the casing to a point over the path of travel of the molds, and a piston working in said cylinder and operated from the drive-shaft, said piston acting on its outstroke to force the material through the feed-pipe and on its instroke retaining the material against discharge.

3. The combination with a housing having an opening in the forward end, and an endless irregular track within the housing and extending across the opening at an angle, of an endless carrier in the housing, a drive-shaft, a plurality of bake-molds each embodying two members hinged together and one of which is connected at opposite sides to the carrier, an arm carried by the other member and engaging the track, two rows of heating-burners between which the molds are carried, a charging-cylinder secured to the outer face of one side of the casing and having a feed-inlet in its upper side, a discharge-pipe communicating with the cylinder above the lower wall thereof and leading through the casing to the interior thereof, and a piston operated from the drive-shaft and working in the cylinder to intermittently feed the material through the discharge-pipe to the molds.

In testimony whereof I affix my signature in the presence of two witnesses.

ERNEST L. SONS.

Witnesses:
E. E. POTTER,
K. H. BUTLER.